2,962,417

NITROARYLDISULFIDE PESTICIDE

John F. Harris, Jr., Wilmington, Del., assignor to E. I. du Pont de Nemours and Company, Wilmington, Del., a corporation of Delaware No Drawing. Filed Aug. 27, 1956, Ser. No. 606,184

3 Claims. (Cl. 167—30)

This invention relates to biological toxicant compositions, more particularly antibacterial, fungicidal, and herbicidal compositions, and methods employing as an essential active ingredient a nitroaryl disulfide of the kind more particularly described below.

This application is a continuation-in-part of my copending United States patent application Serial No. 447,653, filed August 3, 1954, now abandoned.

Despite the large number of biological toxicant compositions which have been introduced in recent years, particularly for use in inhibiting bacterial, fungal and higher forms of plant growth, it is not possible to readily deduce from the structure of a compound whether or not it has biological toxicant activity. A further complexing factor is the variation in biological activity of a compound. Activity often varies with the specific variety of pest to be controlled and with the conditions of application.

To have a maximum effect, the biological toxicant composition should be selective in its action. In other words, it should destroy or inhibit the growth of the pest or weed but should not interfere with the normal functioning of the host, or with the surrounding environment, whether animal or plant crop. The composition should also be soluble, or at least dispersible, in aqueous media because water is much preferred to organic solvents in biological toxicant uses.

I have now found that these requirements are met by biological toxicant compositions containing as an essential active ingredient an aromatic disulfide of the formula (1)  Ar—S—S—Y where Ar is a nitroaryl group, i.e., an aromatic hydrocarbon radical containing from 1 to 2 nitro groups, and Y is a hydrocarbon group of 1 to 10 carbons or a monofunctionally substituted hydrocarbon group containing up to 10 carbons including a salt or salt-forming group as a substituent. By the term salt and salt-forming group I mean to include carboxyl radical, sulfonyl radical, and aryl radical of from 6 to 10 carbon atoms containing a nuclear hydroxyl radical. Other monofunctional groups which fall within the scope of "Y" of Formula 1 are carbonyl, alkoxycarbonyl and alkoxythiocarbonyl.

A typical example of a disulfide of the above type is dinitrophenyl ethyl disulfide, (2)

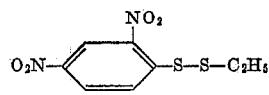

which is effective against Escherichia coli, 6A, Micrococcus pyogenes var. aureus, H Strain, and Streptococcus faecalis, 10Cl. If the ethyl group in this compound is replaced by $C_{16}H_{33}$, the resultant compound is ineffective as an antibacterial agent. This marked difference in activity is attributed to the greater water solubility of the ethyl compound.

To be sufficiently effective for practical use, the substituent on the sulfur to the right in Formula 1 should be either a hydrocarbon group of not more than ten carbons or a hydrocarbon group containing a substituent that enhances its water solubility, such as a salt or salt-forming group, e.g., carboxyl, sulfonic, or phenolic hydroxyl. Particularly effective compounds of this class are represented by the formula (3)  Ar—S—S—R—COOH where Ar is an aromatic hydrocarbon, preferably phenyl, containing from 1 to 2 nitro groups and R is a hydrocarbon group containing up to 9 carbon atoms.

Compounds represented by Formula 3 wherein Ar is a phenyl group containing from 1 to 2 nitro groups are fully described and claimed in my copending joint application with Marvin Carmack, U.S. Serial No. 408,020, filed February 3, 1954, now abandoned. In brief, the unsymmetrical nitrophenyl disulfides claimed in this copending case are prepared by reacting substantially equimolecular portions of a sulfenyl halide of the formula Ar—S—X where X is halogen, preferably chlorine or bromine, with a mercaptoacid represented by the formula H—S—$R^1$—COOH where $R^1$ is an open-chain hydrocarbon or an acyl substituted open-chain hydrocarbon radical. Alternatively, some of the disulfides can be prepared by a dithiohalide (Ar—$S_2$hal) with a ketene, followed by hydrolysis; or by reacting a dithiohalide with ethyl acetoacetate.

The disulfides used in this invention are conveniently prepared by reacting a nitroarylsulfenyl chloride with a mercaptan of formula Y—SH, where Y has the meaning indicated in Formula 1. Thus, 2-nitrophenyl carboxymethyl disulfide (4), (4)

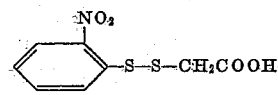

can be prepared by adding 1 part of thioglycolic acid dissolved in 10 parts of anhydrous ether to 2.6 parts of o-nitrobenzenesulfenyl chloride dissolved in about 60 parts of anhydrous ether; allowing the mixture to stand for an hour; evaporating the mixture to dryness; and recrystallizing the residue from benzene. The product (4) thus obtained (approximately 3 parts) is a yellow solid melting at 119–120° C.

The nitroaryl disulfides used in the biological toxicant compositions of the invention are in general characterized by bacterial and fungicidal activity at relatively low levels and herbicidal at higher concentrations. For example, 2-nitrophenyl ethoxythiocarbonyl disulfide at levels of about 31 and 125 p.p.m. is inhibitory to the growth of the bacteria Micrococcus pyogenes and Streptococcus faecalis respectively; at 400 p.p.m., the compound controlled the fungus disease, bean rust (Uromyces appendiculatus) on bean without plant injury; while at 10,000 p.p.m. the compound has pronounced herbicidal qualities as measured in foliar sprays on tomato.

The biological toxicant compositions of the invention are prepared by admixing one or more of the nitroaryl disulfides defined heretofore, in pesticidal or herbicidal effective amounts, with a conditioning agent or carrier of the kind used and referred to in the art as a biological toxicant adjuvant or modifier in order to provide formulations adapted for ready and efficient application using conventional equipment to areas in which it is desired to destroy or control the growth of weeds, unwanted plants, bacteria, fungi, insects and other animal and plant pests, In the application of nitroaryl disulfides of Formula 1 as biological toxicants, particularly as anti-bacterial agents, the toxicants are normally diluted to a desired concentration, say, 0.001 to 1% or more by admixture with a suitable liquid or solid carrier. Thus, they can be dissolved or dispersed in water or organic solvents and applied as liquids, or they may be admixed with solid carriers and applied as dusts. Particularly effective liquid compositions are those based on water containing a surface active agent. Nitroaryl disulfides containing acid groups are conveniently used in the form of their sodium or ammonium salts in water. Suitable solid carriers include finely divided talc, sulfur, calcium carbonate and bentonite.

As already indicated, the pesticidal compositions may be made from a mixture of nitroaryl disulfides since some of the disulfides are more effective towards certain pests than others, and the mixture produces a greater over-all effect. The disulfides may also be used in conjunction with other pest control agents.

In order to utilize the herbicidal activity of the compounds of Formula 1 to the best advantage, they are formulated by admixture with conventional carrier materials or conditioning agents into herbicidal compositions similar except for active ingredient to those disclosed in Todd, U.S. Patent Nos. 2,655,444–447.

The herbicidal method of the present invention comprises applying an aryl carboxyalkyl disulfide of Formula 1, ordinarily in a herbicidal composition of the aforementioned type, to the locus or area to be protected from undesirable plant growth. The active compound is, of course, applied in sufficient amount to exert the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions and the like. In general, when applied as a foliar spray, a dosage of about 20 to 60 pounds per acre is used.

This method is applicable to the control of both broad leaf and grassy annual and perennial weeds, such as yellow foxtail, Johnson grass, wild mustard, dandelion and Lamb's-quarters. It has particular utility as a contact agent for the control of annual broad leaves, such as Lamb's-quarters, ragweed, pigweed and annual grassy weeds, such as yellow foxtail and crabgrass.

In order that the invention can be better understood, the following examples are given in addition to those set forth above:

EXAMPLE I

*Agar plate-paper disc method*

This method for testing antibacterial compositions was carried out as follows: Selected test bacteria were grown in 2% tryptose broth for 18–24 hours at 37° C. The test organism was then inoculated into melted 2% tryptose agar and this poured into sterile petri plates and allowed to harden. Paper discs impregnated with the disulfides to be tested were then placed on the surface of the inoculated agar plates and the plates incubated at 37° C. for 18–24 hours. The paper discs were of sterile ½" diameter filter paper. They were impregnated with a solution obtained as follows. A total of 50 mg. of the disulfide was dissolved in 5 ml. of acetone. Of this acetone solution, 0.1 ml. was used to treat the disc after which the acetone was evaporated. The final concentration of compound per disc was 1000 micrograms (1000 μg).

The width of the zone of inhibition of bacterial growth surrounding the paper disc was measured. This zone corresponds to the absence of all growth of the test organism and is indicative of the potency of the compound tested. In Table I, the zones of inhibition (in mm.) are shown for the following compounds:

A=2-nitrophenylcarboxymethyl disulfide (M.P. 119–120° C.)

B=2,4-dinitrophenyl-4-carboxybutyl disulfide (M.P. 119–120° C.)

C=2,4-dinitrophenyl carboxymethyl disulfide (M.P. 138–139° C.)

D=2,4 - dinitrophenyl - 5 - carboxypentyl disulfide (M.P. 117° C.)

E=2-nitrophenyl-5-carboxypentyl disulfide (M.P. 82–82.5° C.)

TABLE I

[Zones of inhibition (in mm.)]

| Compound | *Micrococcus pyogenes* var. *aureus*, H Strain | *Streptococcus faecalis*, 10C1 | *Pseudomonas aeruginosa*, Temple Strain |
|---|---|---|---|
| A | 37–42 | 19–21 | 30–30 |
| B | 30–35 | 25–27 | 33–34 |
| C | 30–34 | 29–30 | 38–40 |
| D | 27–33 | 23–24 | 28–29 |
| E | 29–30 | 23–25 | ------------ |

The two numbers in the above table represent results of duplicate assays.

EXAMPLE II

*Tube dilution assay*

In this test tube dilution assay, each of the above compounds (A, B, C, D and E of Example I) was tested to determine the minimum concentration at which it would prevent bacterial growth. Ten milligrams of each compound was dissolved in a small amount of acetone containing sodium bicarbonate and the mixture was diluted to 10 ml. with sterile 2% tryptose broth. A series of six test tubes (1, 2, 3, etc.) each containing 2 ml. of sterile 2% tryptose broth was prepared. A total of 2 ml. of the solution containing the test compound was added to tube 1, the solutions thoroughly mixed, and 2 ml. from the latter tube transferred to tube 2. After mixing, this procedure was repeated for the other tubes with 2 ml. from the final tube being discarded. The tubes contained the following concentrations of compound: Tube 1=500 μg./ml.; Tube 2=250 μg./ml.; Tube 3=125 μg./ml.; Tube 4=62.5 μg./ml.; Tube 5=31.25 μg/ml.; and Tube 6=15.6 μg./ml.

Cultures of the test organisms were grown in 2% tryptose broth for 18–24 hours at 37° C. and diluted 1:10 in sterile tryptose broth. Tubes 1–6 along with a control were inoculated with 0.1 ml. of the 1:10 culture dilutions and the tubes incubated at 37° C. for 18–24 hours and examined for presence or absence of growth. In Table II are recorded the results of duplicate assays for each of the compounds expressed in terms of a concentration (in micrograms per ml.) at and above which no bacterial growth occurred.

TABLE II

[Minimum inhibitory concentration (μg./ml.)]

| Compound | Test Organisms | |
|---|---|---|
| | *Micrococcus pyogenes* var. *aureus* | *Streptococcus faecalis* |
| A | 15.6 | 125 |
| B | 15.6 | 31.25 |
| C | 31.25 | 62.5 |
| D | 31.25 | 15.6 |
| E | 15.6 | 31.25 |

EXAMPLE III

Following the procedure used in Examples I and II, plate-disc and tube-dilution assays were made of 2,4-dinitrophenyl ethyl disulfide with the following results:

PLATE-DISC ASSAY

[Zone of inhibition in mm.]

| Micrococcus pyogenes var. aureus, H Strain | Streptococcus faecalis, 10Cl | Escherichia coli, 6A |
|---|---|---|
| 20, 20 | 17, 17 | 0, 0 |

TUBE-DILUTION ASSAY

| Micrococcus pyogenes, var. aureus, H Strain | Streptococcus faecalis, 10Cl | Escherichia coli, 6A |
|---|---|---|
| 15.6 | 15.6 | 31.25 |

EXAMPLE IV

The general method of Example II was used to determine the minimum concentration to prevent bacterial growth of a series of compounds containing a nitroaryl SS-group. The following table lists the structural formula of the compound, its melting point and the inhibitory concentration in micrograms per ml.

TABLE

| Compound | | Inhibitory Concentration | |
|---|---|---|---|
| Structural Formula | M.P., °C. | Micrococcus pyogenes var. aureus | Streptococcus faecalis |
| $O_2N$-C$_6$H$_4$-SSCH$_2$COCH$_3$ | 111–112 | 31.25 | 15.6 |
| $O_2N$-C$_6$H$_4$-SS-(cyclohexanone) | 128.5–129.5 | 15.6 | 62.5 |
| $O_2N$-C$_6$H$_4$-SS-N(morpholino) | 104–105 | 15.6 | 15.6 |
| $O_2N$-C$_6$H$_4$-SSNH-C$_6$H$_4$-CH$_3$ | 122–123 | 15.6 | 31.25 |
| $O_2N$-C$_6$H$_4$-SS-N(phthalimido) | 221–226 | 125 | ——— |
| $O_2N$-C$_6$H$_4$-SS-SO$_2$-C$_6$H$_4$-CH$_3$ | 141.5–142.5 | 62.5 | 500 |
| $O_2N$-C$_6$H$_4$-SS-C$_6$H$_4$-OH | 151–151.5 | 15.6 | 15.6 |
| $O_2N$-C$_6$H$_4$-SS-C$_6$H$_3$(OH) | 146.5–147 | 15.6 | 15.6 |
| $O_2N$-C$_6$H$_4$-SS-CHCl-(cyclohexyl) | 82.5–83.5 | 62.5 | 500 |
| $O_2N$-C$_6$H$_4$-SSC$_2$H$_5$ | 30.5–31.5 | 15.6 | 62.5 |

TABLE—Continued

| Compound | | Inhibitory Concentration | |
|---|---|---|---|
| Structural Formula | M.P., °C. | Micrococcus pyogenes var. aureus | Streptococcus faecalis |
| 2-$NO_2$-$C_6H_4$—SS($CH_2$)$_2$COOH | 126–127 | 15.6 | 31.25 |
| 2-$NO_2$-$C_6H_4$—SS—C(=S)O$C_2H_5$ | 64–64.5 | 31.25 | 125 |
| 2,4-$(NO_2)_2$-$C_6H_3$—SS—($CH_2$)$_2$COOH | 128.5–130.5 | 15.6 | 31.25 |
| 2-$NO_2$,6-COOH-$C_6H_3$—SS-$C_6H_5$ | 223–224 | 15.6 | 125 |
| 2-$NO_2$-$C_6H_4$—SS—$CH_2$—$C_6H_5$ | 53–54 | 15.6 | 15.6 |
| 2-$NO_2$-$C_6H_4$—SSC(=O)—$CH_3$ | 77.5–78.5 | 15.6 | 15.6 |
| 2-$NO_2$-$C_6H_4$—SS$CH_2$C(=O)—$C_6H_5$ | 83.5–84.5 | 31.25 | 500 |
| 2,4-$(NO_2)_2$-$C_6H_3$—SS—$C_4H_9(n)$ | 46–47 | 31.25 | 62.5 |
| 2,4-$(NO_2)_2$-$C_6H_3$—SS$CH_2$COOH | 96–97 | 15.6 | 15.6 |
| 2,4-$(NO_2)_2$-$C_6H_3$—SS—$C_6H_{13}(n)$ | 44–44.5 | 125 | 125 |
| 2,4-$(NO_2)_2$-$C_6H_3$—SS—$C_9H_{19}$ | 39.5–41 | 15.6 | 125 |
| 2,4-$(NO_2)_2$-$C_6H_3$—SS$CH_2CH_2$OOC$CH_3$ | 65.5–66 | 62.5 | 125 |

Additional examples of nitroaryl disulfides employed in the pest control compositions and methods of the invention are: 2-nitrophenyl-2-carboxyethyl disulfide, 2,4-dinitrophenyl-3-carboxypropyl disulfide, dinitronaphthyl carboxymethyl disulfide, and the following 2,4-dinitrophenyl disulfides of formula $(NO_2)_2C_6H_4$—S—S—Y, where Y is: $CH_3$, $C_3H_7$, $CH_2CH=CH_2$,

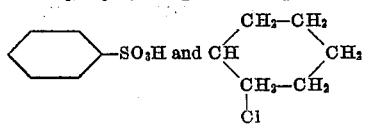

Although the nitroaryl disulfides have been described in the preceding examples with particular reference to their use in antibacterial compositions, they are also effective as above indicated in varying degrees in the control of other harmful lower forms of life including insects, fungi, weeds, and other undesired plants.

Examples V and IX which follow illustrate typical pesticidal compositions of the invention. The numbers following the tabulated ingredients represent parts by weight of the ingredients in the respective compositions.

EXAMPLE V

*Dust formulation*

The dust was made by blending or mixing the ingredients and grinding the mix to give compositions having an average particle size less than about 50 microns.

| | |
|---|---|
| 2,4-dinitrophenyl ethyl disulfide | 20 |
| Talc | 80 |
| | 100 |

EXAMPLE VI

*Granular composition*

The composition was readily prepared by mixing the ingredients with water to form a paste. The paste was then dried under vacuum at 60° C. and ground to give the desired granular size. Preferably the granules will be in the order of one-thirty second to one-quarter inch diameter.

| | |
|---|---:|
| 2,4-dinitrophenyl carboxymethyl disulfide | 10 |
| Goulac | 3 |
| Hydrocarbon oil | 1 |
| Dextrin | 20 |
| Hydrated silica ("Celite") | 66 |
| | 100 |

EXAMPLE VII

*Liquid dispersion composition*

The composition was prepared by dispersing the biologically active ingredient in water by means of a surface active agent.

| | |
|---|---:|
| o-Nitrophenyl-5-carboxypentyl disulfide | 1 |
| Sodium lauryl sulfate | 1 |
| Water | 98 |
| | 100 |

EXAMPLE VIII

*Water-dispersible powder*

The powdered composition was made by intimately mixing the listed ingredients using conventional mixing or blending equipment and then grinding the mixture to give a powder.

| | |
|---|---:|
| o-Nitrophenyl-2-carboxyethyl disulfide | 87.8 |
| Hydrated silica ("Celite") | 10.9 |
| Sodium lauryl sulfate, 50% | 1.3 |
| | 100 |

EXAMPLE IX

*Antibacterial soap*

The following composition was made by mixing the finely ground disulfide with a soap:

| | |
|---|---:|
| 2,4-dinitrophenyl-2-carboxyethyl disulfide | 1 |
| Liquid soap | 99 |
| | 100 |

EXAMPLE X

This example demonstrates the practice of the present method employing wettable powder herbicidal compositions containing as an active ingredient a compound of Formula 1. The wettable powder compositions are prepared by combining the dry ingredients, blending in a ribbon blender, micropulverizing in a hammer mill until substantially all of the product is below 50 microns in particle size, and reblending the product in a ribbon blender to give a free flowing powder that is readily dispersible in water to form dilute sprayable formulations.

A

| | Percent |
|---|---:|
| 2,4-dinitrophenyl ethyl disulfide | 80 |
| Calcium silicate | 18.75 |
| Alkyl aryl sulfonate | 1.0 |
| Methyl cellulose | 0.25 |

B

| | |
|---|---:|
| 2-nitrophenyl carboxymethyl disulfide | 50 |
| Bentonite | 20 |
| Diatomaceous earth | 30 |

These compositions are extended with water to form sprayable formulations containing 1% by weight of the active ingredient. They are then applied using a compression type hand sprayer rig as directed post-emergence treatments in agricultural plots planted to corn and infested with broad leaf weeds. These treatments give excellent post-emergence weed control with no substantial damage to the corn crop.

EXAMPLE XI

This example demonstrates the present herbicidal methods using aqueous solutions containing as active ingredients compounds of Formula 1. These solutions are prepared by slowly adding the water-soluble nitroaryl disulfide derivatives to water under agitation, heating to hasten solution when necessary. A wetting agent is included in some of the formulations to reduce the surface tension and aid in coverage of the foliage to which the solution is to be applied.

A

| | Percent |
|---|---:|
| 2-nitrophenyl-2-carboxyethyl disulfide | 30 |
| Sodium lauryl sulfate | 2 |
| Water | 68 |

B

| | |
|---|---:|
| 2-nitrophenyl-5-carboxypentyl disulfide | 25 |
| Sodium N-methyl-N-oleoyl laurate | 5 |
| Water | 70 |

These aqueous solutions are diluted with water to an active ingredient content of 2% by weight. They are then applied with a sprayer mounted on a railroad car to wet the foliage thoroughly. Excellent control of sprayed weeds is obtained by this treatment.

EXAMPLE XII

This example demonstrates the practice of the present method using dust herbicidal compositions. These dusts are made by first blending and grinding the active aryl carboxyalkyl disulfides with the minor absorptive diluent until the particle size of the active ingredient is substantially less than 50 microns, and then blending the mixture with the major, free flowing, dense diluent in a

A

| | Percent |
|---|---:|
| 2,4-dinitrophenyl-2-carboxyethyl disulfide | 10 |
| Attapulgite, dry | 10 |
| Talc | 80 |

B

| | |
|---|---:|
| 2,4-dinitrophenyl-5-carboxypentyl disulfide | 20 |
| Attapulgite, dry | 20 |
| Pyrophyllite | 60 |

C

| | |
|---|---:|
| 2-dinitrophenyl-5-carboxypentyl disulfide | 10 |
| Diatomaceous earth | 10 |
| Tobacco dust | 80 |

These compositions when applied by hand around the base of telephone poles at the rate of ¼ pound/sq. rod effectively control the weeds growing in the treated area.

EXAMPLE XIII

This example illustrates the preventive fungicidal action of the nitroaryl disulfides of Formula 1. The disulfides were sprayed from an aqueous solution onto bean plants which were infected with bean rust (*Uromyces appendiculatus*). One week later, the plants thus treated were compared with untreated plants. The following data were obtained:

| Active Ingredient | Dosage, Percent | Percent Disease |
|---|---:|---:|
| 2,4-dinitrophenyl ethyl disulfide | 0.2 | 19 |
| 2-nitrophenyl ethoxythiocarbonyl disulfide | 0.04 | 1.5 |
| None | | 100 |

"Percent disease" as used above is calculated with relation to the untreated or control plants which are taken for comparative purposes as being 100% diseased.

Those skilled in the art will appreciate that other pesticidal compositions of the invention, including tooth paste, creams, oils, alcoholic solutions and concentrates, and the like, can be prepared and applied in accordance with the foregoing examples. Thus, the foregoing detailed description has been given for clearness of understanding only and no unnecessary limitations are to be understood therefrom.

I claim:

1. A method for controlling bacterial and fungal pests which comprises applying to areas to be protected, in amount sufficient to exert a biological toxicant action, a nitroaryl disulfide of the formula Ar—S—S—Y where Ar is an aromatic hydrocarbon having from 6 to 10 carbon atoms and containing from 1 to 2 nitro groups, and Y is a hydrocarbon group having from 1 to 10 carbon atoms, said group being selected from the class consisting of unsubstituted hydrocarbyl radicals and monosubstituted hydrocarbyl radicals in which the substituents are selected from the class consisting of carboxyl, carbonyl, alkoxycarbonyl, alkoxythiocarbonyl, sulfonic, and hydroxyaryl radicals.

2. A method of combatting bacterial and fungal pests which comprises subjecting the pest to the action of a composition comprising a compound of the formula Ar—S—S—R—COOH where Ar is a nitroaryl group and R is a hydrocarbon group containing up to 9 carbon atoms, said group being selected from the class consisting of alkylene, arylene, and cycloalkylene radicals.

3. A fungicidal composition comprising an inert fungicidal adjuvant as a carrier therefor, and, as an essential active ingredient in admixture therewith, o-nitrophenyl ethoxythiocarbonyl disulfide.

References Cited in the file of this patent
UNITED STATES PATENTS

| | | |
|---|---|---|
| 2,557,520 | Skinner | June 19, 1951 |
| 2,594,480 | Mowry | Apr. 29, 1952 |
| 2,599,827 | Hansberry | June 10, 1952 |
| 2,600,045 | Blondeau | June 10, 1952 |
| 2,623,838 | Bender | Dec. 30, 1952 |
| 2,624,662 | Erickson | Jan. 6, 1953 |
| 2,645,592 | Campbell | July 14, 1953 |
| 2,849,479 | Carmack | Aug. 26, 1958 |

OTHER REFERENCES

Talen: Chem. Abst., vol. 22 (1928), page 3652.

UNITED STATES PATENT OFFICE
CERTIFICATION OF CORRECTION

November 29, 1960

Patent No. 2,962,417

John F. Harris, Jr.

It is hereby certified that error appears in the above numbered patent requiring correction and that the said Letters Patent should read as corrected below.

Column 7, lines 64 to 68, in the formula, the ring carbon to which the Cl is attached should have only one H; column 10, line 35, after "diluent in a" insert -- ribbon blender. --; column 12, line 1, after "group" insert -- having from 6 to 10 carbon atoms --.

Signed and sealed this 16th day of May 1961.

(SEAL)
Attest:

ERNEST W. SWIDER
Attesting Officer

DAVID L. LADD
Commissioner of Patents